United States Patent [19]

Brignall

[11] 4,154,155

[45] May 15, 1979

[54] TORTILLA HOLDER WITH QUICK RELEASE MEANS

[76] Inventor: Clifford N. Brignall, 268 Lakeshore Rd., Boulder City, Nev. 89005

[21] Appl. No.: 866,641

[22] Filed: Jan. 3, 1978

[51] Int. Cl.² ............................................. A47J 43/18
[52] U.S. Cl. ....................................................... 99/426
[58] Field of Search ................ 99/426, 394, 402, 403, 99/409; 16/119, 120, 125, 126; 220/95, 96

[56] References Cited

U.S. PATENT DOCUMENTS

| 2,775,929 | 1/1957 | Johnson | 99/426 |
| 2,847,933 | 8/1958 | Pate | 99/426 |
| 2,957,404 | 10/1960 | Richardson | 99/426 |
| 3,020,826 | 2/1962 | Silva | 99/426 |

Primary Examiner—Edward J. McCarthy
Attorney, Agent, or Firm—Fulwider, Patton, Rieber, Lee & Utecht

[57] ABSTRACT

A holder for forming and cooking a tortilla within a frying pan. The holder includes an apertured plate of generally U-shaped transverse configuration upon the exterior surfaces of which is removably secured a tortilla by clips. A handle is rotatably connected to a cross-piece that connects the outer ends of the plate. The handle is rotated relative to the cross-piece so as to cause the clips to open and release a cooked tortilla.

4 Claims, 5 Drawing Figures

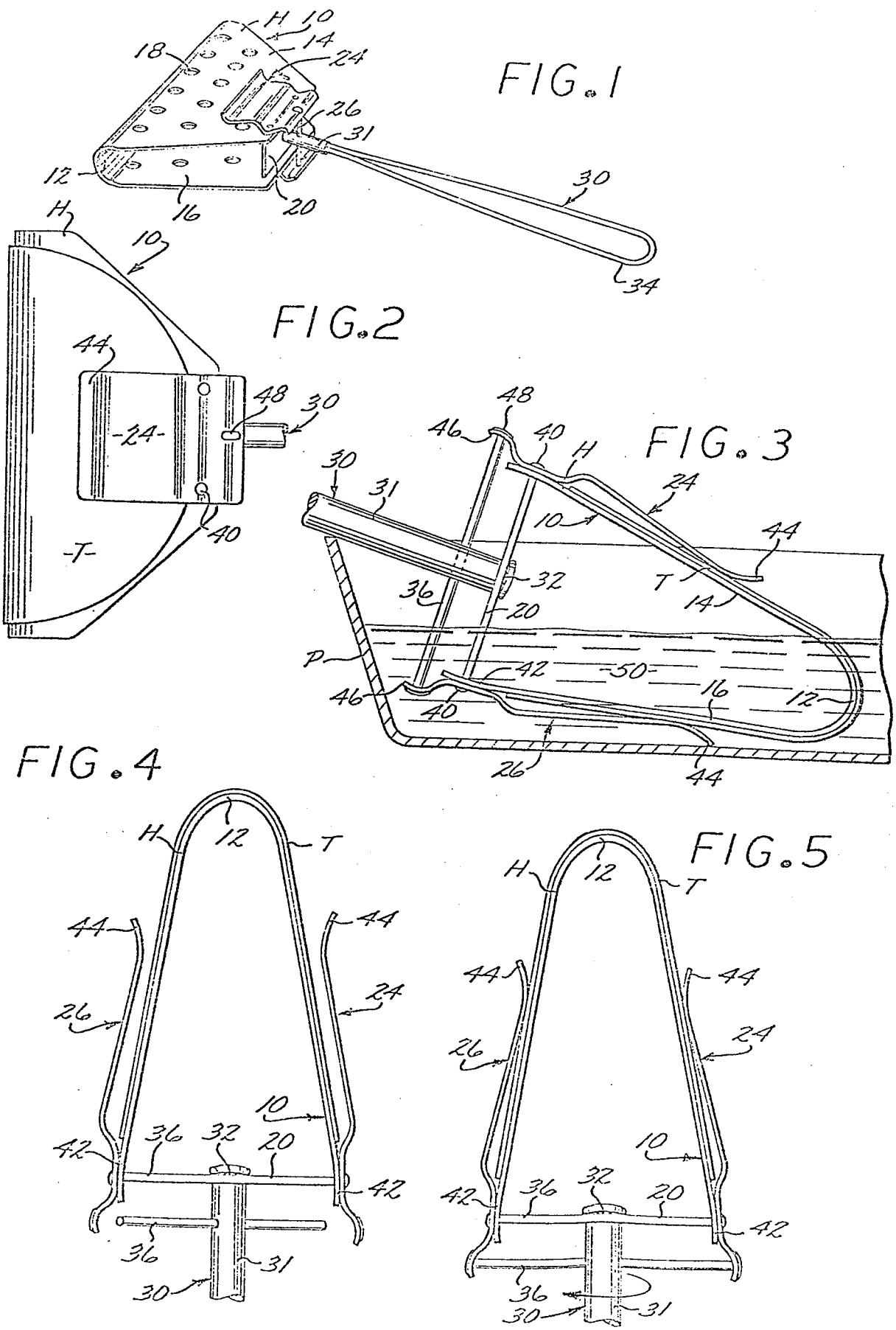

4,154,155

TORTILLA HOLDER WITH QUICK RELEASE MEANS

BACKGROUND OF THE INVENTION

In the preparation of tacos, a type of Latin-American dish in some ways related to a sandwich, it is necessary to bend a tortilla about its diameter to a generally U-shaped configuration, and to fry this tortilla in this configuration so that it becomes a crisp and edible shell. It is possible to fry a tortilla in this general shape using a common type pan, such as the skillet, and using a hand-manipulated instrument such as a fork. This general type of procedure is somewhat disadvantageous for several reasons. One of these is that it is comparatively difficult to adequately hold a tortilla to its desired final shape during the frying operation. Another disadvantage of this essentially manual procedure is that an individual carrying out the process of frying the tortilla is apt to become burned with splattering grease or the like. It is also comparatively difficult to remove the cooked taco shell from a pan once the frying operation has been completed.

In order to simplify the frying of tortillas for tacos a number of different types of tortilla holders have been developed heretofore. These deviced tend to be undesirable because of a number of different factors. Frequently these devices are comparatively complex and, hence, are comparatively expensive when sold. Also, frequently these tortilla holders are mechanically somewhat complex to operate. The average individual preparing tacos desires to use a tortilla holder which is as simple to operate as possible. A very serious difficulty with most of the prior tortilla holders is the removal of a cooked tortilla therefrom immediately following the frying operation.

BRIEF DESCRIPTION OF THE INVENTION

It is a major object of the present invention to provide a holder for forming and cooking a tortilla having quick-release means for easy removal of a cooked tortilla therefrom.

Another object of the present invention is to provide a tortilla holder of the above-described nature which is simple of design and rugged of construction whereby it may be manufactured at low cost and yet will provide a long and trouble-free service life.

Yet a further object of the present invention is to provide a tortilla holder of the above-described nature wherein a tortilla may be quickly and easily positioned for cooking and forming and yet with such tortilla being readily removed from the holder after the cooking and forming thereof.

A more particular object of the present invention is to provide a tortilla holder of the above-described nature utilizing a generally U-shaped plate upon which is secured a tortilla by a pair of normally closed clips, with such plate being provided with a handle which is rotated relative to the plate after a cooking operation to thereby open the clips and release the cooked tortilla.

These and other objects and advantages of the present invention will become apparent from the following detailed description of a preferred embodiment of the invention, when taken in conjunction with the appended drawings.

BRIEF DESCRIPTION OF THE DRAWINGS

FIG. 1 is a perspective view showing a preferred form of tortilla holder embodying the present invention;

FIG. 2 is a broken top plan view of said tortilla holder with a tortilla affixed thereto for cooking;

FIG. 3 is a vertical sectional view taken in enlarged scale through a frying pan within which is positioned the tortilla holder of FIGS. 1 and 2; and FIGS. 4 and 5 are side views of said tortilla holder showing how a tortilla is secured to and removed from said holder.

DESCRIPTION OF THE PREFERRED EMBODIMENT

Referring to the drawings, a preferred form of tortilla holder H embodying the present invention includes a sheet metal plate generally designated 10 that is of generally U-shaped transverse configuration so as to have a central bend 12 rearwardly from which extend a pair of side portions 14 and 16. The plate 10 is formed over its surface with a plurality of apertures 18. A generally vertically extending cross-piece 20 rigidly interconnects the outer or rear ends of the side portions 14 and 16 remote from bend 12. A generally horizontally extending handle, generally designated 30, is rotatably secured at its inner or front end to the mid-portion of cross-piece 20. A pair of like clips, generally designated 24 and 26, are secured upon the exterior surfaces of plate 10 to removably retain a tortilla T on the plate 10 during a cooking operation.

More particularly, handle 30 is defined by a cylinder 31 having its inner end rotatably affixed to the mid-portion of cross-piece 20, as by means of a headed pivot pin 32 that extends through a bore (not shown) formed through the cross-piece into the open inner end of cylinder 31. The outer end of cylinder 31 is formed with a recess (not shown) which rigidly receives the inner ends of a looped length of heavy wire 34 by a force fit. An elongated cam rod 36 extends through a bore (not shown) formed in cylinder 31 rearwardly adjacent cross-piece 20, and is fixedly secured within such bore. Cam rod 36 extends normal to the axis of rotation of cylinder 31 and has its free ends rounded.

Each clip 24 and 26 is formed of resilient sheet metal. The intermediate portion of each clip is pivotally affixed to the opposite edges of cross-piece 20 by rivets 40. It should be noted that the free ends of plate side portions 14 and 16 extend generally parallel with handle 30, as indicated at 42. With this arrangement the curved entry lips 44 of the clips will normally be biased into the open or tortilla-receiving position spaced from their respective plate surfaces, as indicated in FIG. 4. The rear end of each clip is formed along its width with a vertically sloping cam surface 46. The mid-portion of each such cam surface is formed with a locking dimple 48 (FIG. 2) that receives the free ends of cam rod 36. The dimensions of cam rod 36 and clips 24 and 26 are so selected that when the cam rod is rotated into the locking dimples 48, the front end of each clip will be cammed towards its respective plate side portions 14 and 16, as shown in FIGS. 1, 3 and 5.

In utilizing the afore-described tortilla holder H for cooking and forming a tortilla T, a frying pan P containing hot cooking oil 50 is utilized, as shown in FIG. 3. The tortilla T is inserted below the clips 24 and 26, the handle 30 being rotated to its position of FIG. 4 wherein the clips will be spaced away from the plate side portions 14 and 16. With the tortilla T wrapped around the side plate 10, handle 30 will be rotated so that the free ends of cam rod 36 contact the rear ends of the clips and move into the locking dimples 48. Such movement of the cam rod relative to the clips forces the clips inwardly towards the plate side portions 14 and 16 as indicated in FIG. 5. In this position, the clips firmly retain the tortilla T in place upon plate 10. Thereafter, the plate is lowered into the cooking oil 50 with the handle 30 resting upon one side of the frying pan P. In this position, at least the lower half of the tortilla T will be exposed to the cooking oil 50 so as to be cooked thereby. It should be particularly noted that as indicated in FIG. 3, the entry lip 44 of lower clip 26 rests upon the bottom of pan P so as to prevent contact of tortilla T with such pan bottom, thereby avoiding scortching of the tortilla. The tortilla holder T will support itself in the position of FIG. 3 as the lower portion of the tortilla is cooked.

Thereafter, the tortilla holder H is inverted so as to deposit the uncooked upper portion of the tortilla within the cooking oil. When the previously uncooked portion of the tortilla has been cooked, handle 30 will be utilized to lift the plate 10 and its attached tortilla out of the pan P. The cooked and formed tortilla may then be readily released from the plate 10 by merely rotating handle 30 to its position of FIG. 4. In this position, the clips 24 and 26 will automatically move away from the tortilla whereby with the plate 10 inverted the cooked and formed tortilla may drop therefrom. The tortilla holder H is then ready to receive a second tortilla for cooking and forming into a taco shell.

During the cooking operation, the apertures 18 permit ready access of the cooking oil to the inside of the folded-over tortilla.

Various modifications and changes may be made with respect to the foregoing detailed description without departing from the spirit of the present invention.

I claim:

1. A holder for forming and cooking a tortilla within a pan, said holder comprising:
   an apertured plate that is of generally U-shaped transverse configuration so as to have a central bend from which a pair of side portions extend forwardly;
   a generally vertically extending cross-piece rigidly interconnecting the front ends of said side portions remote from said bend;
   a generally horizontally extending handle that is rotatably secured at its front end to the mid-portion of said cross-piece;
   an elongated cam rod rigidly affixed to said handle adjacent said cross-piece and extending normal to the axis of rotation of said handle; and
   a pair of clips pivotally secured to the exterior opposite surfaces of said plate for pivotal movement towards and away from their respective plate surfaces to receive an uncooked tortilla and release a cooked tortilla, with the outer ends of each of said clips normally being biased away from its respective plate surface, and with the ends of said cam rod engaging the inner ends of said clips to pivot said clips towards their respective plate surfaces.

2. A tortilla holder as set forth in claim 1, wherein:
   the middle of the outer ends of said clips are formed with a locking dimple to removably receive the ends of said cam rod.

3. A tortilla holder as set forth in claim 1, wherein:
   the intermediate portion of said clips are attached to the opposite ends of said cross-piece.

4. A tortilla holder as set forth in claim 2, wherein:
   the intermediate portion of said clips are attached to the opposite ends of said cross-piece.

* * * * *